May 7, 1935. S. B. GRISCOM ET AL 2,000,753
ELECTROMAGNETIC OVER-SPEED PROTECTION
Filed May 11, 1933
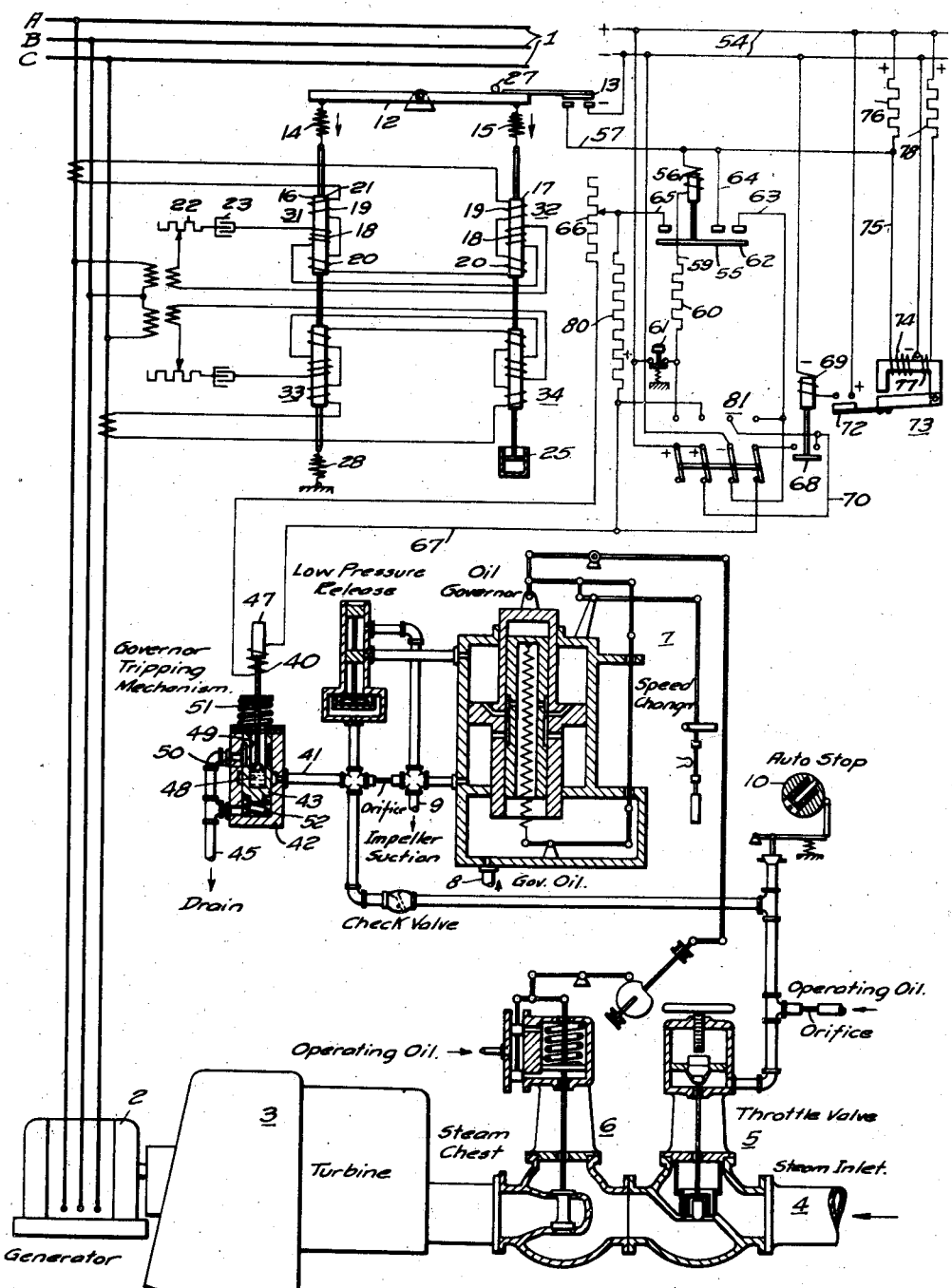
WITNESSES:
INVENTORS.
Samuel B. Griscom
and Homer C. Nycum.
BY
ATTORNEY Patented May 7, 1935

2,000,753

UNITED STATES PATENT OFFICE 2,000,753

ELECTROMAGNETIC OVER-SPEED PROTECTION

Samuel B. Griscom, Pittsburgh, and Homer C. Nycum, Wilkinsburg, Pa., assignors to Westinghouse Electric & Manufacturing Company, East Pittsburgh, Pa., a corporation of Pennsylvania Application May 11, 1933, Serial No. 670,486

19 Claims. (Cl. 290—40)

Our invention relates to a transient anticipator which is utilized for the purpose of responding to an electrical transient of a system or machine and thus effecting a control operation in anticipation of the change in characteristic which will result from said transient. Although our invention is not by any means limited to a speed-control mechanism, it will be described and illustrated more particularly in relation to an electro-magnetic over-speed protection device for anticipating the operation of a speed-governor on the fluid input to a turbine driving an electrical generator.

When an electrical generator, which is operating as a part of a synchronous transmission system, suddenly loses a large block of load, as a result of a short circuit or other cause, there will be a certain time, which in one instance amounted to about 3 seconds, before the speed of the generator will increase sufficiently to cause the speed-governor, which is invariably associated with the prime mover of the generator, to begin to close off the fluid-input to the prime mover. There is a certain apparently inevitable over-speeding which will be produced as a result of the expansion of the fluid which is entrapped within the turbine or between the turbine and the shut-off valve, if the fluid is steam, or as a result of the impossibility of shutting off the fluid very rapidly, if the fluid is water, but this effect is in addition to the fluid which flows for the time necessary for the governor to begin to operate. Each turbine is necessarily provided with an automatic over-speed stop device which will shut down the turbine in case of a very excessive over-speed. When this occurs, however, a serious outage is usually produced in the electrical system, because it takes a matter of considerable time, usually of the order of 20 minutes or more, before that particular generator may be restored to service on the line, and the loss of that generator capacity, for that length of time, may be sufficient to disrupt the power system over a rather extensive territory.

It is one of the principal objects of our invention to avoid the above-mentioned 3 seconds of acceleration, or acceleration during the time required before the governor begins to act in response to a sudden dropping of a large block of electrical load, in order to forestall, if possible, such a great over-speeding as would result in the tripping of the automatic over-speed stop mechanism.

A further object of our invention is to effect improvements in the details, combinations and connections of the electrical transient-responsive device and electrical control circuits for effecting the above-mentioned speed-controlling operation, or any other controlling operation which is required on the generator in order to permit it to perform its functions properly in spite of the sudden load-change, to the incipience of which our anticipator device responds.

With the foregoing and other objects in view, our invention consists in the apparatus, circuits and systems hereinafter described and claimed and illustrated in the accompanying drawing, the single figure of which is a diagrammatic view of circuits and apparatus embodying our invention in a preferred form.

We have shown our invention in application to a synchronous three-phase transmission system which is intended to be symbolized by the three transmission-line conductors 1. Said transmission system includes a number of substantially constant-voltage synchronous machines, including a generator 2 which is driven by a turbine 3 which is supplied from a fluid-input source, such as a steam inlet device 4, controlled by a throttle valve 5 and a governor-actuated valve 6, the latter being controlled by a governor which is responsive to the speed of the turbine or generator shaft, said governor being illustrated as an oil governor 7 which receives and discharges oil in response to impeller action in accordance with the speed of the turbine or generator shaft, as indicated at 8 and 9.

The speed-governor 7 may be any governor suitable for the purpose. The particular governor illustrated is similar to the constructions shown in a Schmidt Patent 1,533,767, granted April 14, 1925, a Hodgkinson Patent 1,599,892, granted September 14, 1926, and a Schwendner Patent 1,729,458, granted September 24, 1929, all assigned to the Westinghouse Electric & Manufacturing Company.

In addition to the speed-governor 7, the generator and turbine are protected from excessive over-speeds by means of an automatic stop-device of conventional design, which is indicated diagrammatically at 10. The effect of this automatic stop-device is to shut off the throttle valve 5 and shut down the generator and turbine, which, as hereinabove explained, is a serious thing to do in an operating transmission system.

In order to respond to an electrical transient and thus to anticipate a control change which should be effected as a result in the changed electrical conditions, we utilize an electrical contact-making instrument comprising a balanced beam 12 carrying electrical contact devices 13. Each end of the beam is pulled downwardly by means of a spring 14, 15, respectivelly, as indicated by the arrows. Pulling downwardly on the springs 14 and 15 are a pair of electrically balanced electro-magnetic devices 16 and 17, respectively, which are illustrated as being three-coil plunger watt-meter elements of the type described in the Boddie Patent 1,565,410, granted December 15, 1925. Each of the watt-meter elements consists of a centrally disposed voltage-responsive coil 18 and two oppositely wound current-responsive coils 19 and 20 which are disposed near the ends of a core or plunger 21, so that the stray flux from the voltage coil will cut the current coils and tend to force the plunger downwardly in response to the amount of load on the generator.

In order to respond to load conditions on a plurality of phases, we utilize two pairs of such watt-meter elements, the top pair being responsive to the current in phase A and the voltage in phase A—B, and the bottom pair being responsive to the current in phase C and to the voltage in phase B—C, as will be apparent from the drawing. The calibration of the watt-meter elements is effected by means of a variable resistance 22 in series with the voltage coils 18, and the phase of the current traversing the voltage coil is corrected by means of a capacitor 23 in series therewith.

The combined pulls of the electrical watt-meter elements on the two ends of the balanced beam 12 are carefully adjusted to exactly balance each other, but the movement of the electrical elements pulling on the spring 15 of the balanced beam is caused to be sluggish, in its response to sudden load-changes, by means of a retarding mechanism such as a dash-pot 25, whereas the response of the electrical metering devices pulling on the other spring 14 of the balanced beam is substantially instantaneous.

The balanced beam 12 is normally biased against a stop 27 by any suitable means such as a light spring 28 which counter-balances the weight of the dash-pot 25 and slightly over-counter-balances the same so as to hold the beam-contacts 13 open, in the normal position of the instrument.

Normally, the pulls of the four watt-meter elements 31, 32, 33 and 34 are exactly balanced against each other, so that the springs 14 and 15 are distended equal amounts, thus producing balanced forces on the beam 12, except for the very slight bias produced by the spring 28 which biases the beam against its back-stop 27. When a small or gradual change in load occurs in the electrical system, such as normally occurs in operation, the dash-pot 25 permits the watt-meter elements 32 and 34 to change their positions about as quickly as the watt-meter elements 31 and 33, so that the slight bias of the spring 28 is not overcome. In the event of a sudden very large loss of electrical load, however, the dash-pot 25 prevents any material sudden change in the position of the watt-meter plungers 32 and 34, so that the contact-closing pull of the spring 15 on the beam remains substantially unchanged. However, the other two watt-meter plunger elements 31 and 33 are not retarded and hence substantially instantaneously release their downward pull on the contact-opening spring 14 of the beam, in proportion to the amount of load suddenly lost by the generator, thus causing the beam-contacts 13 to close. We have found that it is quite possible to adjust the biasing spring 28 so that the instrument responds very sensitively to a certain predetermined load-loss, so that the contacts 13 will not close unless the amount of load which is suddenly lost by the generator exceeds a rather sharply defined definite amount. We can thus adjust our instrument so that it will not respond to the load-changes which are expected in practice when there is no need to operate the speed-governor or other control devices.

The instrument contacts 13 are utilized to control the energization of a suitable controlling device which is illustrated as a solenoid 40 associated with the oil speed-governor 7. The governor is of a type having high-pressure input oil 8 and low-pressure output or impeller-suction oil 9, and it is arranged with an auxiliary low-pressure oil-output duct 41 which, when opened, makes the governor respond as if there had been an increase in the speed of the shaft being governed. The electrically controlled solenoid 40 is for the purpose of opening this auxiliary low-pressure-oil output-duct 41 by means of an oil valve 42 having a movable sleeve 43 which is depressed by the energization of the solenoid 40 so as to connect the low-pressure-oil output-duct 41 with a drain 45.

The solenoid 40 is provided with a magnetizable plunger 47 which is sucked downwardly by the solenoid and thus presses downwardly on a body of oil 48 which is disposed within a hollow 49 in the movable sleeve 43, the pressure of the solenoid-plunger 47 being transmitted to the movable sleeve 43 by means of an oil-plunger 50 pressing on the body of oil 48. The solenoid-plunger is normally biased toward its elevated position by means of a spring 51, and the movable sleeve is normally biased to its elevated or shut-off position by means of a spring 52.

When the low-pressure-oil trip-mechanism just described is operated, the solenoid-plunger 47 suddenly pushes downwardly on the body of oil 48 in the movable sleeve 43, thus causing the latter to move downwardly, against the pressure of its restraining spring 52, so as to open the valve and permit the low-pressure oil to escape from the governor 7 to the drain 45. Provision is made, however, for an oil leakage out of the body of oil 48, such as by means of a slightly loose fit of the oil-plunger 50, so that the movable sleeve 43 immediately begins to rise, even though the solenoid-plunger is held depressed by the continuous energization of the solenoid 40. After a predetermined time delay, which may be the 3 seconds previously mentioned, or other predetermined time, the movable sleeve 43 will have risen sufficiently to shut off the oil-valve 42, thus interposing a mechanical safeguard to make it impossible for the electrical control device to take away the control of the oil speed-governor 7 over the speed of the shaft of the turbine and generator, for more than the predetermined time allowed by the oil-valve 42.

The mechanical oil-leakage safeguard 42 is described and claimed in an application of O. N. Bryant, Serial No. 345,351, filed March 8, 1929, assigned to the Westinghouse Electric & Manufacturing Company.

Current is supplied to the tripping solenoid 40 for the low-pressure oil of the governor 7, from a direct-current supply source 54, through certain mechanism, the operation of which is initiated by the closing of the instrument-contacts 13. This mechanism includes a holding relay 55 having an operating coil 56, one terminal of which is connected to a terminal conductor 57 of one of the switch-terminals 13 of the instrument, the other switch-terminal being connected to the negative lead (—) of the direct-current source 54. The energizing circuit of the holding-relay coil 56 is completed through a conductor 59, a resistance device 60, and a normally closed push button 61, to the positive conductor (+).

When the holding relay 56 picks up it locks itself in, independently of whether the instrument-contacts 13 remain closed or not, this being desirable in order to cause the oil-trip solenoid 40 to be properly energized, for a sufficient length of time, even though the instrument-contacts 13 close only momentarily. When the holding relay 55 picks up, it carries a movable contact member 62 which makes contact across three stationary contact members which are the terminals, respectively, of three conductors, to wit, the conductor 63 which is connected to the negative bus (—), the conductor 64 which is connected to the instrument switch-terminal 57, and the conductor 65 which is connected, through an adjustable resistance device 66, to one terminal of the low-pressure oil-trip solenoid 40. The circuit for this oil-trip solenoid 40 is completed through a conductor 67 and the movable contacts 68 of an auxiliary relay 69, and thence through a conductor 70 to the positive bus (+).

The auxiliary relay 69 is normally energized across the direct-current bus terminals (+) and (—), the circuit being normally closed by means of a movable contact member 72 of a timing relay 73 of any suitable type, whereby the time delay of 3 seconds or other predetermined time may be effected. This time-delay relay is shown as being of the magnetic type covered by a Cook Patent 1,753,983, granted April 8, 1930. It comprises a main or magnetizing coil 74 which is normally energized, having one terminal connected to the negative bus (—) and the other terminal connected, through a conductor 75 and a resistor 76, to the positive bus (+). The timing relay 73 is also provided with a neutralizing coil 77 having only a few turns, just sufficient to kill the residual magnetism left by the magnetizing coil 74 when the latter is deenergized, thus bringing the magnetization of the relay down to zero, without any residual magnetization. The neutralizing coil is permanently connected across the direct-current busses 54 through a resistor 78. The conductor 75 of the magnetizing coil 74 of the timing relay is connected to the switch-terminal 57 of the instrument contact-member 13.

The operation of the switching mechanism just described is as follows:

When the balance beam 12 of the electrical metering instrument tips over, and closes the instrument contacts 13 in response to a predetermined direction, rate and amount of change in the electrical load or other electrical characteristic for which the instrument is connected to respond, the contact-terminal conductor 57 is connected to the negative bus (—). The holding-relay 55 is instantly energized through the circuit 56—60—61. At the same time, the instrument-contacts 13 are by-passed through the circuit 64—63, which connects the contact-terminal conductor 57 to the negative bus (—) through the movable contact member 62 of the holding relay 55, thus keeping the contact-terminal conductor 57 energized from the negative bus, independently of the instrument-contacts 13.

The actuation of the holding-relay 55 energizes the conductor terminal 65 thereof from the negative bus (—), through the conductor 63. The energization of the conductor terminal 65 of the holding-relay energizes the low-pressure oil-trip solenoid 40, the circuit of which is completed through the conductor 67, the contacts 68 of the normally energized auxiliary relay 69, and the conductor 70 which is connected to the positive bus (+). The actuation of the solenoid 40 sucks down the plunger 41 of the solenoid and thus causes the oil speed-responsive governor to operate substantially instantaneously just as if the speed of the governor shaft were too high, thus effecting the closure of the governor actuated valve 6, which quickly cuts off the fluid-input to the turbine 3.

As soon as the contact-terminal conductor 57 is energized from the negative bus (—), it short-circuits the magnetizing coil 74 of the normally energized timing relay 73, said short-circuit connection including the negative bus (—), the contact-terminal conductor 57, and the conductor 75. The timing relay 73 then begins to demagnetize, which proceeds at a certain predetermined rate, dependent upon the design-constants of the relay, and when the magnetization drops to a predetermined small value, the relay releases its movable contact-member 72 and opens the circuit of the auxiliary relay 69, thereby opening the auxiliary-relay contacts 68 and disconnecting the terminal conductor 67 of the low-pressure oil-trip solenoid 40 from the conductor 70 which leads to the positive bus terminal (+).

The oil-trip solenoid is preferably shunted by a discharge resistor 80 which facilitates the discharge of the magnetizing current of the solenoid, without producing excessive arcing at the auxiliary-relay contacts 68.

The operation just described is produced by the connections shown in the drawing. These connections may be changed, however, by means of a double-throw four-pole switch 81. In the position of the double-throw switch 81 shown in the drawing, making the connections as hereinabove described, it will be noted that the effects of the timing relay 73, and the auxiliary relay 69 with which it is associated, are to cause the deenergization of the oil-trip solenoid 40, or other controlled device, after a predetermined brief time interval, but accomplishing this function without disturbing the energizing circuit of the holding relay 55, so that the latter remains energized, thus rendering our electrical transient-anticipator mechanism inoperative to perform any further functions until the holding circuit of the holding relay 55 is interrupted by a momentary depression of the push button 61. This places the repeated operation of the transient presetter mechanism under the control of the station attendant.

By a manipulation of the double-throw switch 81, however, the station attendant can adjust the electrical connections so that the transient-anticipating mechanism will reset itself automatically after each operation, so that it will respond repeatedly, in the event of repeated transients which are of sufficient intensity and in the proper direction to operate the balanced-beam watt-meter element.

Assuming, now, that the double-throw switch 81 has been changed, from its lower position as shown in the drawing, to its upper position, the circuits will be as follows: The push-button 61 will be by-passed by the first blade of the double-throw switch, so that the push-button will no longer be needed or effective in any way. The terminal conductor 67 of the oil-trip solenoid 40 will be connected directly to the positive bus (+), without the intermediary of the auxiliary-relay contacts 68. The auxiliary-relay contacts 68 will be connected between the negative bus (—) and the terminal conductor 63 of the holding relay 56, so that the instrument terminal-conductor 57 will be connected to the negative bus (—) only as long as the auxiliary relay contacts 68 are closed, or as long as the instrument contacts 13 are closed, if the latter should remain closed longer than the time allowed by the timing relay 73, which, in general, would not be the case, because the dash-pot 25 on the watt-meter instrument would meanwhile have had sufficient time to permit the balanced beam 12 of the instrument to return to its normal biased position, with the instrument-contacts 13 open.

The operation of our switching mechanism, with the double-throw switch 81 in its upper position as just described, will then be similar to that which has previously been outlined, except for the effect of the timing relay 73 and the auxiliary relay 69 which it controls. When the timing relay 73 releases its contacts 72, after the predetermined brief time interval, the auxiliary relay contacts 68 will open-circuit the relay-terminal conductor 63 of the holding relay 55. It will be noted that this conductor supplies energy not only to the relay-terminal conductor 65, which leads to the oil-trip solenoid 40, but it also supplies energy, through the relay-terminal conductor 64, to the holding coil 56 of the holding relay 55, so that the holding relay 55 and the oil-trip solenoid 40 are both deenergized, placing the electrical switching mechanisms in their initial condition, removing the short-circuit on the magnetizing coil 74 of the timing relay 73, and restoring the auxiliary relay 69 to its initial energized condition.

While we have described our invention more particularly in connection with a means for effecting a speed-controlling operation in response to a predetermined transient in the electrical power output of the generator 2, it will be understood that our instrument and relay mechanism may be utilized to energize any controlling mechanism which may be symbolized by the solenoid 40, so as to perform any operation which is found to be useful for the purpose of improving the operation of the generator after the transient or sudden change in electrical characteristic has been completed. The foregoing and other changes and modifications may obviously be made without departing from the spirit of our invention. We desire, therefore, that the appended claims shall be accorded the broadest construction consistent with their language and the prior art.

We claim as our invention:

1. An electrical metering instrument comprising a balanced beam carrying an electric contact member, a separate spring pulling downwardly on each end of the beam, a separate electro-responsive member pulling downwardly on each spring, means for causing one of said electro-responsive members to move slowly and the other to move quickly, in response to a sudden electrical change, and means for slightly biasing said beam toward a normal predetermined position.

2. A polyphase electrical metering instrument comprising a balanced beam carrying an electric contact member, a separate spring pulling downwardly on each end of the beam, a separate set of a plurality of electro-responsive members adapted to be energized from different phases and pulling downwardly on each spring, means for causing the electro-responsive members on one end of the beam to move slowly and the other electro-responsive members to move quickly, in response to a sudden electrical change, and means for slightly biasing said beam toward a normal predetermined position.

3. A substantially constant-voltage synchronous transmission system including a synchronous dynamo-electric machine having an automatic regulating means associated therewith to effect a corrective control operation in response to a predetermined departure of a variable quantity of the machine from a predetermined value, and a transient-anticipator mechanism including an electrical metering instrument having contacts which are substantially instantaneously closed in response to a predetermined transient in an electrical characteristic, an electric controlled device and a holding relay energized substantially simultaneously in response to said instrument-contacts, said electric controlled device being operative to overrule said automatic regulating means and to effect a corrective control-operation before said automatic regulating means would have had time to act, said holding relay by-passing said instrument-contacts and keeping them by-passed even though they should reopen, and a time-delay device set in operation substantially simultaneously with said controlled device for effecting the deenergization of said controlled device after a predetermined brief time interval.

4. Protective mechanism for a synchronous transmission system including a transmission line, a generator, a prime mover for the generator, input-regulating means for the prime mover, and a speed-governor for controlling the input-regulating means, said protective mechanism comprising a transient-anticipator mechanism including an electrical metering instrument having contacts which are substantially instantaneously closed in response to a predetermined transient in an electrical characteristic, an electric controlled device and a holding relay energized substantially simultaneously in response to said instrument-contacts, said electric controlled device being operative to take over the control of said input-regulating means for a brief predetermined time, and to effect a control operation in the proper direction before the speed-governor would have had time to act, said holding relay by-passing said instrument-contacts and keeping them by-passed even though they should reopen, and a time-delay device set in operation substantially simultaneously with said controlled device for effecting the deenergization of said controlled device after a predetermined brief time interval.

5. A substantially constant-voltage synchronous transmission system including a synchronous dynamo-electric machine having an automatic regulating means associated therewith to effect a corrective control operation in response to a predetermined departure of a variable quantity of the machine from a predetermined value, and a transient-anticipator mechanism including an electrical metering instrument comprising a balanced beam carrying an electric contact member, a separate spring pulling downwardly on each end of the beam, a separate electro-responsive member pulling downwardly on each of said springs, means for causing one of said electro-responsive members to move slowly and the other to move quickly, in response to a sudden electrical change, and means for slightly biasing said beam toward a normal predetermined position, electro-responsive means controlled by said instrument for overruling said automatic regulating means and effecting a corrective control-operation before said automatic regulating means would have had time to act, and means for subsequently, at the conclusion of a brief predetermined time, restoring the control to said automatic regulating means.

6. Protective mechanism for a synchronous transmission system including a transmission line, a generator, a prime mover for the generator, input-regulating means for the prime mover, and a speed-governor for controlling the input-regulating means, said protective mechanism comprising a transient-anticipator mechanism including an electrical metering instrument comprising a balanced beam carrying an electric contact member, a separate spring pulling downwardly on each end of the beam, a separate electro-responsive member pulling downwardly on each of said springs, means for causing one of said electro-responsive members to move slowly and the other to move quickly, in response to a sudden electrical change, and means for slightly biasing said beam toward a normal predetermined position, and electro-responsive means controlled by said instrument for taking over the control of said input-regulating means for a brief predetermined time, effecting a control operation in the proper direction before the speed-governor would have had time to act, and subsequently, at the conclusion of said brief predetermined time, restoring the control of said input-regulating means to said speed-governor.

7. A transient-anticipator mechanism comprising an electrical metering instrument having contacts which are substantially instantaneously closed in response to a predetermined transient, an electric controlled device and a holding relay energized substantially simultaneously in response to said instrument-contacts, said holding relay by-passing said instrument-contacts and keeping them by-passed even though they should re-open, and a time-delay device set in operation substantially simultaneously with said controlled device for effecting the deenergization of said controlled device after a predetermined brief time interval.

8. A transient-anticipator mechanism comprising an electrical metering instrument having contacts which are substantially instantaneously closed in response to a predetermined transient, an electric controlled device and a holding relay energized substantially simultaneously in response to said instrument-contacts, said holding relay by-passing said instrument-contacts and keeping them by-passed even though they should reopen, a time-delay device set in operation substantially simultaneously with said controlled device for effecting the deenergization of said controlled device after a predetermined brief time interval, said time-delay device leaving said holding relay still energized, and hand-operated means for deenergizing said holding relay.

9. A transient-anticipator mechanism comprising an electrical metering instrument having contacts which are substantially instantaneously closed in response to a predetermined transient, an electric controlled device and a holding relay energized substantially simultaneously in response to said instrument-contacts, said holding relay by-passing said instrument-contacts and keeping them by-passed even though they should reopen, and a time-delay device set in operation substantially simultaneously with said controlled device for effecting the deenergization of said controlled device after a predetermined brief time interval, said time-delay device interrupting the energization of said holding relay.

10. A polyphase electrical instrument comprising means for producing a force responsive quickly to a predetermined suddenly variable electrical quantity in one phase, means for producing a normally substantially equal force responsive, but only sluggishly, to the same suddenly variable electrical quantity in the same phase, means for augmenting said quickly responsive force with a second force responsive quickly to a correspondingly suddenly variable electrical quantity in at least one other phase, means for augmenting said sluggishly responsive force with a second force corresponding to said second quickly responsive force, but only sluggishly responsive to the aforesaid suddenly variable electrical quantity in at least one other phase, and means for responding to a predetermined inequality between said quickly responsive forces and said sluggishly responsive forces.

11. A polyphase electrical instrument comprising means for producing a force responsive quickly to a predetermined suddenly variable electrical quantity in one phase, means for producing a normally substantially equal force responsive, but only sluggishly, to the same suddenly variable electrical quantity in the same phase, means for augmenting said quickly responsive force with a second force responsive quickly to a corresponding suddenly variable electrical quantity in at least one other phase, means for augmenting said sluggishly responsive force with a second force corresponding to said second quickly responsive force, but only sluggishly responsive to the aforesaid suddenly variable electrical quantity in at least one other phase, and means including a contact member for responding to a predetermined inequality between said quickly responsive forces and said sluggishly responsive forces.

12. A substantially constant-voltage synchronous transmission system including a synchronous dynamo-electric machine having an automatic regulating means associated therewith to effect a corrective control operation in response to a predetermined departure of a variable quantity of the machine from a predetermined value, a transient-anticipator mechanism, means responsive to said transient-anticipator mechanism for overruling said automatic regulating means and effecting a corrective control-operation before said automatic regulating means would have had time to act, and means for subsequently, at the conclusion of a brief predetermined time, restoring the control to said automatic regulating means, said transient-anticipator mechanism comprising means for producing a force responsive quickly to a predetermined suddenly variable electrical quantity of said machine, means for producing a normally substantially equal force responsive, but only sluggishly, to the same suddenly variable electrical quantity, and means for responding to a predetermined inequality in said forces.

13. A substantially constant-voltage synchronous transmission system including a synchronous dynamo-electric machine having an automatic regulating means associated therewith to effect a corrective control operation in response to a predetermined departure of a variable quantity of the machine from a predetermined value, a transient-anticipator mechanism, electro-responsive means responsive to said transient-anticipator mechanism for overruling said automatic regulating means and effecting a corrective control-operation before said automatic regulating means would have had time to act, and means for subsequently, at the conclusion of a brief predetermined time, restoring the control to said automatic regulating means, said transient-anticipator mechanism comprising means for producing a force responsive quickly to a predetermined suddenly variable electrical quantity of said machine, means for producing a normally substantially equal force responsive, but only sluggishly, to the same suddenly variable electrical quantity, and means including a contact-member for responding to a predetermined inequality in said forces.

14. Protective mechanism for a synchronous transmission system including a transmission line, a generator, a prime mover for the generator, input-regulating means for the prime mover, and a speed-governor for controlling the input-regulating means, said protective mechanism comprising a transient-anticipator mechanism, means responsive to said transient-anticipator mechanism for taking over the control of said input-regulating means for a brief predetermined time, effecting a control operation in the proper direction before the speed-governor would have had time to act, and subsequently, at the conclusion of said brief predetermined time, restoring the control of said input-regulating means to said speed-governor, said transient-anticipator mechanism comprising means for producing a force responsive quickly to a predetermined suddenly variable electrical quantity of said machine, means for producing a normally substantially equal force responsive, but only sluggishly, to the same suddenly variable electrical quantity, and means for responding to a predetermined inequality in said forces.

15. Protective mechanism for a synchronous transmission system including a transmission line, a generator, a prime mover for the generator, input-regulating means for the prime mover, and a speed-governor for controlling the input-regulating means, said protective mechanism comprising a transient-anticipator mechanism, electro-responsive means responsive to said transient-anticipator mechanism for taking over the control of said input-regulating means for a brief predetermined time, effecting a control operation in the proper direction before the speed-governor would have had time to act, and subsequently, at the conclusion of said brief predetermined time, restoring the control of said input-regulating means to said speed-governor, said transient-anticipator mechanism comprising means for producing a force responsive quickly to a predetermined suddenly variable electrical quantity of said machine, means for producing a normally substantially equal force responsive, but only sluggishly, to the same suddenly variable electrical quantity, and means including a contact-member for responding to a predetermined inequality in said forces.

16. An electrical metering instrument comprising an electric contact member, a spring biased to close said contact member, a spring biased to open said contact member, a separate electro-responsive member for biasing each spring, means for causing one of said electro-responsive members to move slowly and the other to move quickly, in response to a sudden electrical change, and means for slightly biasing said contact member toward a normal predetermined position.

17. A polyphase electrical metering instrument comprising an electric contact member, a spring biased to close said contact member, a spring biased to open said contact member, a separate set of a plurality of electro-responsive members adapted to be energized from different phases for biasing each spring, means for causing one set of electro-responsive members to move slowly and the other electro-responsive members to move quickly, in response to a sudden electrical change, and means for slightly biasing said contact member toward a normal predetermined position.

18. A substantially constant-voltage synchronous transmission system including a synchronous dynamo-electric machine having an automatic regulating means associated therewith to effect a corrective control operation in response to a predetermined departure of a variable quantity of the machine from a predetermined value, and a transient-anticipator mechanism including an electrical metering instrument comprising an electric contact member, a spring biased to close said contact member, a spring biased to open said contact member, a separate electro-responsive member for biasing each of said springs, means for causing one of said electro-responsive members to move slowly and the other to move quickly, in response to a sudden electrical change, means for slightly biasing said contact member toward a normal predetermined position, electro-responsive means controlled by said instrument for over-ruling said automatic regulating means and effecting a corrective control-operation before said automatic regulating means would have had time to act, and means for subsequently, at the conclusion of a brief predetermined time, restoring the control to said automatic regulating means.

19. Protective mechanism for a synchronous transmission system including a transmisison line, a generator, a prime mover for the generator, input-regulating means for the prime mover, and a speed-governor for controlling the input-regulating means, said protective mechanism comprising a transient-anticipator mechanism including an electrical metering instrument comprising an electric contact member, a spring biased to close said contact member, a spring biased to open said contact member, a separate electro-responsive member for biasing each of said springs, means for causing one of said electro-responsive members to move slowly and the other to move quickly, in response to a sudden electrical change, means for slightly biasing said contact member toward a normal predetermined position, and electro-responsive means controlled by said instrument for taking over the control of said input-regulating means for a brief predetermined time, effecting a control operation in the proper direction before the speed-governor would have had time to act, and subsequently, at the conclusion of said brief predetermined time, restoring the control of said input-regulating means to said speed-governor.

SAMUEL B. GRISCOM.
HOMER C. NYCUM.